United States Patent [19]
Echols, Jr.

[11] 3,734,528
[45] May 22, 1973

[54] POULTRY HANDLING CART

[76] Inventor: Thedford D. Echols, Jr., Rt. No. 6, Box 9, Cumming, Ga. 30130

[22] Filed: July 14, 1971

[21] Appl. No.: 162,481

[52] U.S. Cl. ................................................. 280/42
[51] Int. Cl. ............................................. B02b 11/00
[58] Field of Search ..................... 280/34 B, 42, 36 C, 280/36 R, 41 C, 41 D, 47.19, 47.25, 47.2, 47.21, 47.24, 47.33, 63, 47.23, 47.26

[56] References Cited

UNITED STATES PATENTS

| | | | |
|---|---|---|---|
| 3,403,924 | 10/1968 | Oliveira | 280/63 |
| 1,742,485 | 1/1930 | Parsons | 280/47.26 |
| 1,679,107 | 7/1928 | Woldt | 280/34 B |
| 3,163,438 | 12/1964 | Bliss | 280/63 |
| 2,767,996 | 10/1956 | Seyforth | 280/40 |

FOREIGN PATENTS OR APPLICATIONS

| | | | |
|---|---|---|---|
| 1,155,562 | 7/1956 | France | 280/47.26 |
| 76,770 | 7/1948 | Czechoslovakia | 280/40 |

*Primary Examiner*—Leo Friaglia
*Assistant Examiner*—Robert R. Song
*Attorney*—Newton, Hopkins & Ormsby

[57] ABSTRACT

A cart for use in the placement of chicks in a broiler house wherein the chicks are delivered from the hatchery to the broiler house in a plurality of trays by a transport vehicle means and are transferred into the broiler house by utilizing the cart. The chick placement cart is movable between an extended tray supporting position and a collapsed position and includes a first and second wheel assembly having frame support means associated with each of the wheel assemblies, with the two wheel assemblies being connected to each other by a pair of pivotally collapsible frame assemblies. The wheel assemblies and connectible frame assemblies are detailed for providing a supporting surface for supporting and maintaining a plurality of chick carrying trays thereon when in the extended tray supporting position. The connectible frame means for attaching the two wheel assemblies to each other includes a number of pivotally connected frame elements having openings therein adapted to be moved into alignment with openings on wheel assembly frame members, with connecting pins adapted to be inserted through the aligned openings for maintaining the cart in an extended tray carrying position. The connecting pins include attachment means for maintaining the pins in position relative to the cart, with the pin attachment means detailed in length for allowing the pins to be inserted through alternate holes when the cart is moved to a collapsed position, whereby the pin and pin attachment means are operable for maintaining the cart in a collapsed position.

4 Claims, 3 Drawing Figures

PATENTED MAY 22 1973 3,734,528

INVENTOR:
THEDFORD D. ECHOLS, JR.
BY: Newton, Hopkins, & Ormsby
ATTORNEYS 3,734,528

POULTRY HANDLING CART

BACKGROUND OF THE INVENTION

This invention relates to means for aiding in the placement of chicks in a broiler house. More particularly, this invention is directed to a foldable poultry handling cart which is detailed for supporting and maneuvering a plurality of trays carrying baby chicks from the transport vehicle through the broiler house to allow the baby chicks to be unloaded therefrom.

The customary practice in placing baby chicks in a broiler house is for a hatchery bus, loaded with trays of chicks, to back up to the door of the broiler house, and then everyone available pitches in to unload the trays of chicks by hand.

The plastic trays are not exactly light weight, and with the added weight of the plurality of baby chicks in them, transporting trays by hand is hard work, time consuming and expensive.

In the unloading of a bus load of baby chicks at a broiler house, the individuals doing the job will often make as many as 30 plus trips back and forth to the bus to hand-carry the trays of baby chicks to the various positions within the broiler house. Often times, conventional wheel barrow means or other feed carts have been utilized for transporting the trays of baby chicks through the broiler house. However, since the wheel barrow means or feed carts were not designed for maintaining and supporting the trays of baby chicks, their use is difficult, requiring several people to maintain the trays of baby chicks in place while transporting them through the broiler house. Another problem with using wheel barrows and feed carts, a wheel barrow or feed cart would have to be available at the broiler house, since there would not be room on the hatchery bus for transporting wheel barrows and feed carts.

In the poultry industry, modern machinery including automatic feeders have been provided for increasing the efficiency in a broiler operation. However, about the only real change insofar as transporting and delivering the baby chicks to a broiler house has been the adoption of plastic trays.

In an analysis of the prior method of placing chicks in a broiler house, it was concluded that the most time consuming part of the job was carrying the plastic trays to the various remote locations of the broiler house whereby the chicks could be unloaded therefrom.

SUMMARY OF THE INVENTION

The above disadvantages of the prior art have been overcome by the present invention which basically includes a cart detailed in design for supporting a plurality of plastic trays containing baby chicks, with wheel means for allowing the cart to be maneuvered through a broiler house in the placement of chicks. The tray carrying cart of the present invention is constructed of a pair of wheel assemblies which are connected to each other by collapsible frame means. The collapsible frame means are detailed in design to be moved between adjusted positions to maintain the wheel assemblies in horizontally spaced relationship for supporting a plurality of chick containing trays and adapted to be moved to a collapsed position whereby the cart can be reduced in overall size for transport and storage. The cart is provided with handle guide means to allow the cart to be maneuvered in a chick placement operation.

Each of the wheel assemblies includes at least one wheel means rotatably supported thereon and positioned relative to leg support means whereby the cart will present a substantially horizontally oriented supporting surface for receiving a plurality of chick carrying trays. The wheel assemblies and collapsible frame assemblies are adapted to be connected in the extended tray carrying position by connecting pins, with the connecting pins being attached to the cart frame by flexible chain means. The flexible chain means are detailed in dimensions whereby the connecting pins can be moved to alternate openings for maintaining the cart in a collapsed position during transport and storage.

An important feature of the present invention is the construction of the wheel assemblies and the collapsible frame assemblies whereby the wheel assemblies include fore and aft extending frame members located adjacent each side of the support wheels with the fore and aft extending frame members being connected together by vertically spaced angle members which are pivotally attached to each other a pivotally attached to the inboard fore and aft frame member and adapted to be moved to a position overlapping the outboard fore and aft frame member to provide maximum supporting rigidity of the cart.

It is therefore a primary object of the present invention to provide a poultry handling cart which can be utilized for transporting a plurality of chick containing trays from a hatchery bus into the broiler house during a chick placing operation.

Another object of this invention is to provide a poultry handling cart which can be adjusted to a collapsed position for transport and storage.

A further object of this invention is to provide a poultry handling cart which is simple in construction and operation, economical to manufacture and reliable in performance.

Still other objects and advantages of the details of construction will become apparent upon reading the following description of the illustrative embodiment with reference to the attached drawings wherein like reference numerals have been used to refer to like parts throughout the several figures, and wherein:

DESCRIPTION OF THE ILLUSTRATIVE EMBODIMENTS

Figure 1:
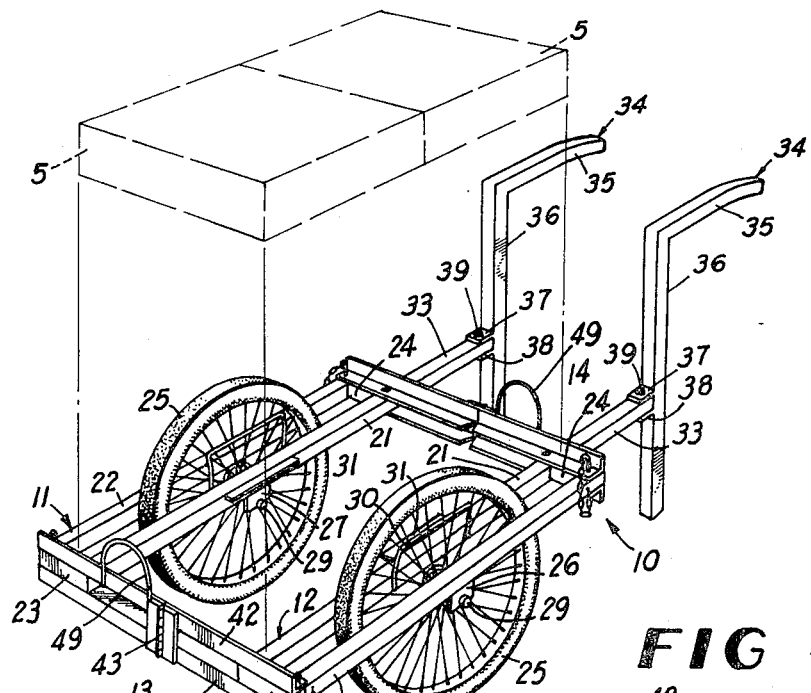
FIG. 1 is a perspective view of the poultry handling cart embodying the principles of the present invention, showing a number of chick carrying trays in dotted lines.

Referring now to the drawings, the poultry handling cart of the present invention is represented generally by the reference numeral 10 and will be described with reference to a first wheel assembly 11, a second wheel assembly 12 and a pair of collapsible connecting frame assemblies 13, 14.

Figure 2:
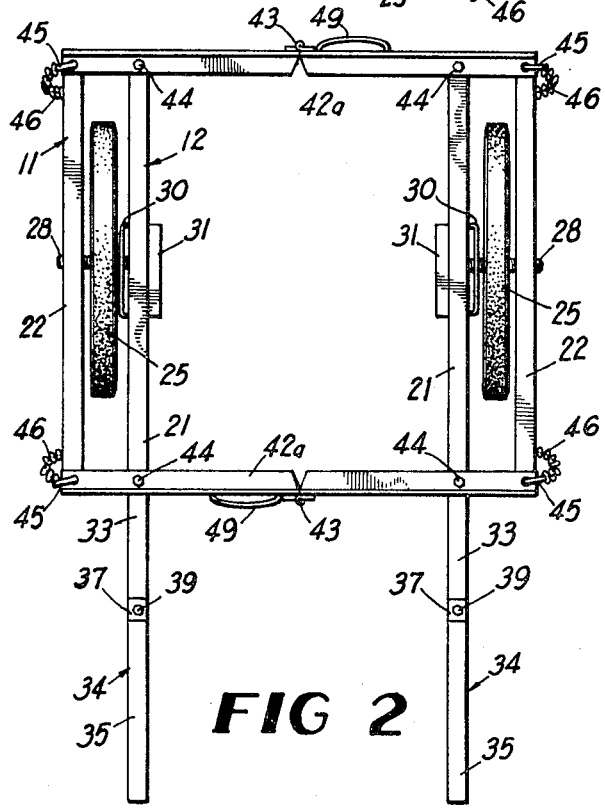
FIG. 2 is a top plan view of the poultry handling cart of FIG. 1.
Figure 3:
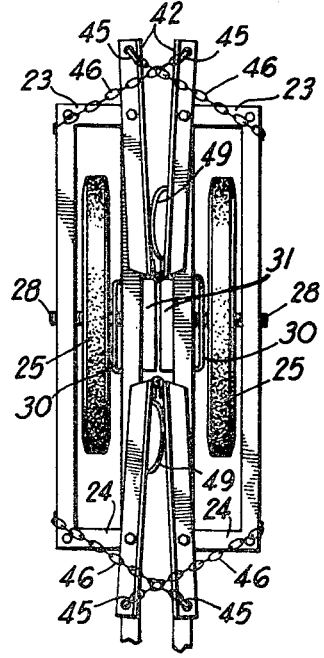
FIG. 3 is a fragmentary top plan view of the poultry handling cart shown in FIG. 2 with the cart being adjusted in a collapsed position for transport and storage.

As shown in FIGS. 1–3, each of the wheel assemblies 11, 12 includes an elongated inboard frame member 21 and an elongated outboard frame member 22. The frame members 21, 22 are of tubular metal stock construction and are connected to each other adjacent their opposite ends by short frame elements 23, 24. The frame elements 21-24 are connected to each other by conventional means such as welding. A conventional wheel means 25 is rotatably supported on each of the wheel assemblies by a pair of downwardly extending bracket support members 26, 27. The bracket support frame members 26, 27 are provided with aligned openings for receiving the supporting shaft 28 (FIG. 2) of the wheel means 25. The wheel means 25 and supporting shafts 28 are secured in position within the support brackets 26, 27 by conventional threaded connecting bolt means 29.

As shown in FIGS. 1 and 2, tray guide members 30 are secured to the inboard elongated frame members 21. The tray guide members 21 are constructed in the form of a substantially inverted U-shaped member having a base member with a pair of downwardly extending leg members. The leg members are secured adjacent one edge of the elongated frame members 21 whereby a chick carrying tray, shown in dotted line in FIG. 1 and generally represented by the reference numeral 5, is guided into a supported position on the upper surface of supporting members 31. The support members 31 are secured to the side of elongated members 21 and project laterally inward to provide a support for the bottom of tray members 5. The length of the elongated frame members 21 are detailed for supporting a pair of the chick carrying trays 5 in horizontally aligned juxtaposition thereon. The guide members 30 and support members 31 are detailed in dimensions and location to guide and support the contacting edges of a pair of juxtapositioned trays 5.

As shown in FIGS. 1 and 2, the elongated inboard frame members 21 are provided with extension 33 having secured thereto handle guide members 34. The handle guide members include horizontally oriented handle gripping portions 35 and vertically oriented leg portions 36. The leg portions 36 are secured to the frame member extension 33 adjacent an intermediate portion thereof by a pair of vertically spaced connecting brackets 37, 38. The connecting brackets 37, 38 are secured to the leg members 36 by conventional means such as welding and are provided with coaxially aligned openings adapted to be aligned with openings in extensions 33 whereby conventional threaded connecting members 39 can be inserted therethrough. The connecting means between the handle guide members 34 and the extensions 33 will permit disassembly of the handle guide means for package and shipment of the cart.

As shown in FIG. 1, the handle leg members 36 are detailed in dimensions to extend below the connecting brackets 36, 37 a sufficient amount to provide a supporting leg for contacting the ground to maintain the cart frame members 21, 22 in a substantially horizontal oriented position.

As shown in FIGS. 1-3, the wheel assembly 11 is adapted to be operatively connected to the wheel assembly 12 for forming a chick carrying cart by means of a pair of collapsible frame assemblies 13, 14. Each of the frame assemblies 13, 14 includes a pair of vertically spaced angled frame elements 41, 42. The frame elements 41, 42 are secured in vertically spaced substantially parallel relationship by means of connecting hinge members 43. The connecting hinge members 43 are connected to the frame elements 41, 42 so that the frame elements 41, 42 can be pivoted relative to each other about a substantially vertical axis, as shown in FIG. 1. The frame elements 41, 42 are provided with aligned openings (not shown) which are adapted to be connected with a vertically aligned opening (not shown) of the inboard frame members 21 by conventional pivot pin means 44. In an assembled relationship, the frame assemblies 13, 14 are secured to the wheel assemblies 11, 12 whereby the angle members 42 will be secured to the upper surface of members 23, 24 and the angle members 41 will be secured beneath the bottom surface of the wheel assembly frame members 23, 33. The dimensions of the angle members 41, 42 are detailed such that they extend outwardly beyond the pivot connecting means 44 sufficiently to overlap the outboard wheel assembly frame members 22. As shown in FIGS. 1 and 2, the extended end of the angle frame elements 41, 42 are secured in an extended tray carrying position relative to the wheel assemblies by means of connecting pins 45. The connecting pins 45 are adapted to be inserted through aligned openings in the angle frame elements 41, 42 and through an opening provided in the elongated frame members 22. The connecting pins 45 are adapted to be maintained in place relative to the cart by flexible connecting chain members 46. The connecting chain members 46 are utilized for maintaining the cart in a collapsed position as will be described in more detail hereinbelow and as shown in FIG. 3.

As shown in FIGS. 1 and 2, the angle frame elements 42 are provided with chick tray guide members 49. The chick tray guide members 49 are of substantially inverted U-shaped construction having a base with a pair of depending legs which are secured to the angle frame elements 42, by conventional means such as welding. The tray guide members 49 will function to guide and maintain chick carrying trays in position on the angle frame elements 42 and in position on the inboard frame members 21 as will be described in more detail hereinbelow.

As shown by the dotted lines of FIG. 2, the chick carrying trays 5 are supported in position relative to the angle frame elements 41, 42 such that the bottom tray will be positioned and supported by the horizontal leg portions 42a of the angle frame elements 42. One of the trays will be supported adjacent one edge by the angle frame element horizontal leg 42a and will be supported adjacent its opposite edges by the laterally extending support members 31. The second juxtaposition tray 5 will be supported by the second horizontal leg portion of the laterally spaced angle frame element 42a and will be supported adjacent its position of contact with the other tray 5 by the laterally extending frame members 31.

OPERATION

In utilizing the poultry handling cart of the present invention to transport a plurality of chick carrying trays through the broiler house in a chick placement operation, the cart will be extended to a tray carrying position as shown in FIGS. 1 and 2 wherein the connecting pins 45 are inserted through aligned openings in the outboard support members 22 and the aligned openings in the angle frame elements 41, 42. With the tray carrying cart in an extended position, a plurality of trays is supported by placing a pair of juxtaposition trays thereon, with the trays supported on the support members 31 and horizontal leg portions 42a of the angle frame elements, as described hereinabove. After a first pair of trays has been positioned on the cart, additional trays are stacked in vertically spaced position on the lower trays with a plurality of trays supported on the cart. The trays supported on the cart are maneuvered into position within the broiler house by an operator grasping the two handle guide members 34 and slightly elevating the leg portions 36 from the supporting ground surface and then either pushing or pulling the cart into position within the broiler house. After an operator has positioned the cart in the broiler house, the trays of chicks are removed and the chicks are placed at the desired location within the broiler house.

After a first plurality of trays has been delivered from the hatchery bus to position within the broiler house, the chick carrying cart will return with the empty trays to the bus and be positioned to receive still additional trays for repeating the chick placement operation, until all chicks are placed within the broiler house.

After finishing a chick placement operation at one broiler house and the bus is ready to proceed to another broiler house, the cart is adjusted to a folded collapsed position for placement on the bus for transport to the additional broiler houses. Movement of the cart to the adjusted collapsed position is effected by removing the connecting pin means 45 from their aligned openings within the elongated support members 22 and the angle frame elements 41, 42. After the connecting pins 45 have been removed, the operator can grasp the two tray guide members 49 and slightly press the guide members toward each other which will in turn effect pivotal movement of the angle frame elements 41, 42 about their hinge members 43. A continued adjustment of the collapsible frame assemblies 13, 14 is effected until the cart assumes the position substantially as shown in FIG. 3 with the wheel assembly 11 located closely adjacent the wheel assembly 12 and with the supporting members 31 in abutting contact with each other. After the cart has been completely collapsed, the connecting pins 45 connected to one of the elongated outboard frame members 22 is crossed over and inserted through an opening provided in the extended end of the oppositely directed angle frame elements 41, 42, as shown in FIG. 3. The connecting pins 45 with their attachment chain members 46 will maintain the cart in the collapsed position for easy placement on the hatchery bus for transport to additional broiler houses.

It now becomes apparent that the above described illustrative embodiment of the poultry handling cart is capable of obtaining the above stated objects and advantages. It is obvious that those skilled in the art may make modification in the details of construction without departing from the spirit of the invention which is to be limited only by the scope of the appended claims.

What is claimed is:

1. A cart for use in the placement of chicks in a broiler house, wherein the chicks are delivered to the broiler house in a plurality of trays, said cart comprising, in combination:
   a. a first wheel assembly having at least one wheel means rotatably mounted thereon, said first wheel assembly including a pair of horizontally spaced elongated frame members located on opposite sides of said wheel means and disposed substantially perpendicular to the axis of said wheel means;
   b. a second wheel assembly having at least one wheel means rotatably mounted thereon, said second wheel assembly including a pair of horizontally spaced elongated frame members located on opposite sides of said wheel means and disposed substantially perpendicular to the axis of said wheel means;
   c. connectible frame means operatively associated with said first and second wheel assemblies and operable for connecting said first and second wheel assemblies in horizontal spaced relationship with said wheel means substantially coaxially aligned relative to each other;
   d. support means on said first and second wheel assemblies and on said connectible frame means for supporting a plurality of chick carrying carts thereon, said means including a number of guide elements disposed thereon for guiding and maintaining said chick carrying trays in position on said cart;
   e. said connecting frame means including a number of pivotally connected frame assemblies connected to said first and second wheel assemblies to permit horizontal adjustment of one of said wheel assemblies relative to the other wheel assembly whereby the cart can be adjusted to a collapsed position for storage and transport;
   f. said connectible frame assemblies including a first frame assembly pivotally connected between said wheel assemblies adjacent one end of said elongated frame members and a second frame assembly pivotally connected between an opposite end of said elongated frame members each of said connectible frame assemblies including a first frame element pivotally connected to the inboard elongated frame member of one of said wheel assemblies and pivotally connected to the inboard elongated frame member of the second wheel assembly with the two frame elements being pivotally connected to each other for pivotal movement about a vertical axis substantially centered between said two wheel assemblies; and
   g. each of said connectible frame assemblies including a pair of vertically spaced frame elements pivotally connected about coaxial pivot means to the inboard frame member of said wheel assemblies and adapted to be moved to connectible positions with one frame element disposed over and one under the outboard elongated frame member vertically aligned openings in the portions of said frame elements adapted to be disposed over and under said outboard elongated frame member, an opening in said frame member adapted to register with said aligned openings, and connecting means adapted to be inserted through said registering openings for maintaining the wheel assemblies in a horizontally spaced tray supporting position.

2. A cart for use in the placement of chicks as described in claim 1 further characterized in that each of said wheel assemblies includes projecting means adjacent one end detailed in design for serving as a handle guide means in manipulating said cart in a chick placement operation.

3. A cart for use in the placement of chicks as described in claim 2 further characterized in that each of said handle guide means includes a leg member detailed for serving as a support for maintaining said cart in a substantially horizontal plane during an extended tray supporting position.

4. A cart for use in the placement of chicks in a broiler house, wherein the chicks are delivered to the broiler house in a plurality of trays, said cart comprising, in combination:
   a. a first wheel assembly having at least one wheel means rotatably mounted thereon, said first wheel assembly including a pair of horizontally spaced elongated frame members located on opposite sides of said wheel means and disposed substantially perpendicular to the axis of said wheel means;
   b. a second wheel assembly having at least one wheel means rotatably mounted thereon, said second wheel assembly including a pair of horizontally spaced elongated frame members located on opposite sides of said wheel means and disposed substantially perpendicular to the axis of said wheel means;
   c. connectible frame means operatively associated with said first and second wheel assemblies and operable for connecting said first and second wheel assemblies in horizontal spaced relationship with said wheel means substantially coaxially aligned relative to each other;
   d. support means on said first and second wheel assemblies and on said connectible frame means for supporting a plurality of chick carrying carts thereon, said means including a number of guide elements disposed thereon for guiding and maintaining said chick carrying trays in position on said cart;
   e. said connecting frame means including a number of pivotally connected frame assemblies connected to said first and second wheel assemblies to permit horizontal adjustment of one of said wheel assemblies relative to the other wheel assembly whereby the cart can be adjusted to a collapsed position for storage and transport;
   f. said connectible frame assemblies including a first frame assembly pivotally connected between said wheel assemblies adjacent one end of said elongated frame members and a second frame assembly pivotally connected between an opposite end of said elongated frame members each of said connectible frame assemblies including a first frame element pivotally connected to the inboard elongated frame member of one of said wheel assemblies and pivotally connected to the inboard elongated frame member of the second wheel assembly with the two frame elements being pivotally connected to each other for pivotal movement about a vertical axis substantially centered between said two wheel assemblies; and
   g. said connectible frame means including a number of connecting pins each of which includes cart attachment means, said connectible frame means and the outboard elongated frame members being provided with openings so positioned as to be vertically aligned when said cart is in an extended tray carrying position and said pins being adapted to be inserted through the said openings when so aligned to maintain the cart in said extended position, said pins being adapted to be inserted through alternate openings when said frame members are moved to a collapsed position, whereby said pins and attachment means will maintain said cart in a collapsed condition during transport and storage.

* * * * *